C. W. WILKINSON.
BRAKE FOR BRICK PRESSES.
APPLICATION FILED MAY 1, 1917.
1,302,113.
Patented Apr. 29, 1919.
2 SHEETS—SHEET 1.
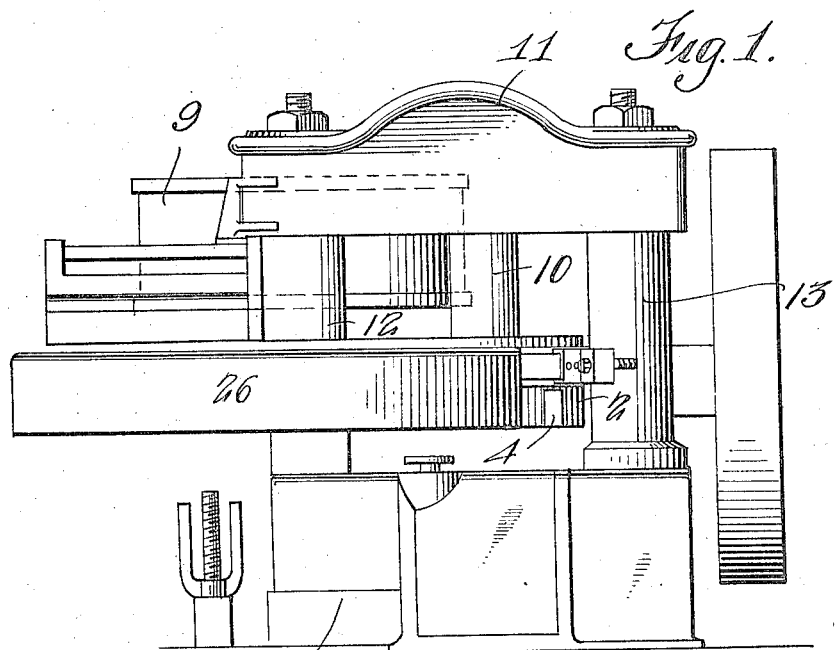
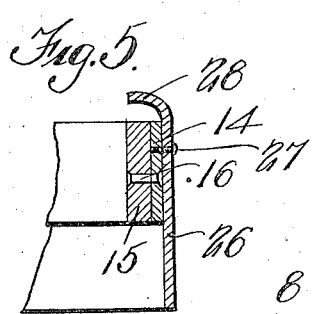
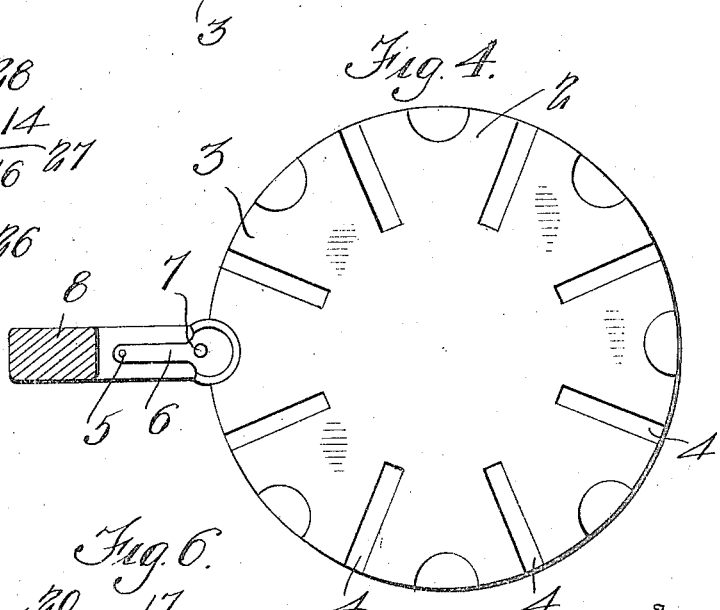
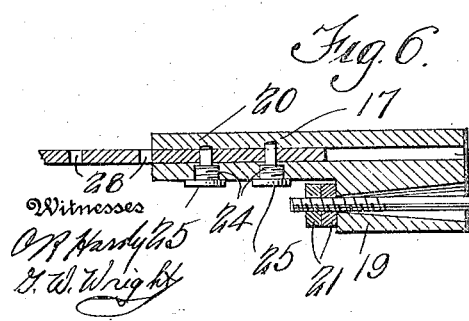
Witnesses
Inventor
C. W. Wilkinson
Attorney

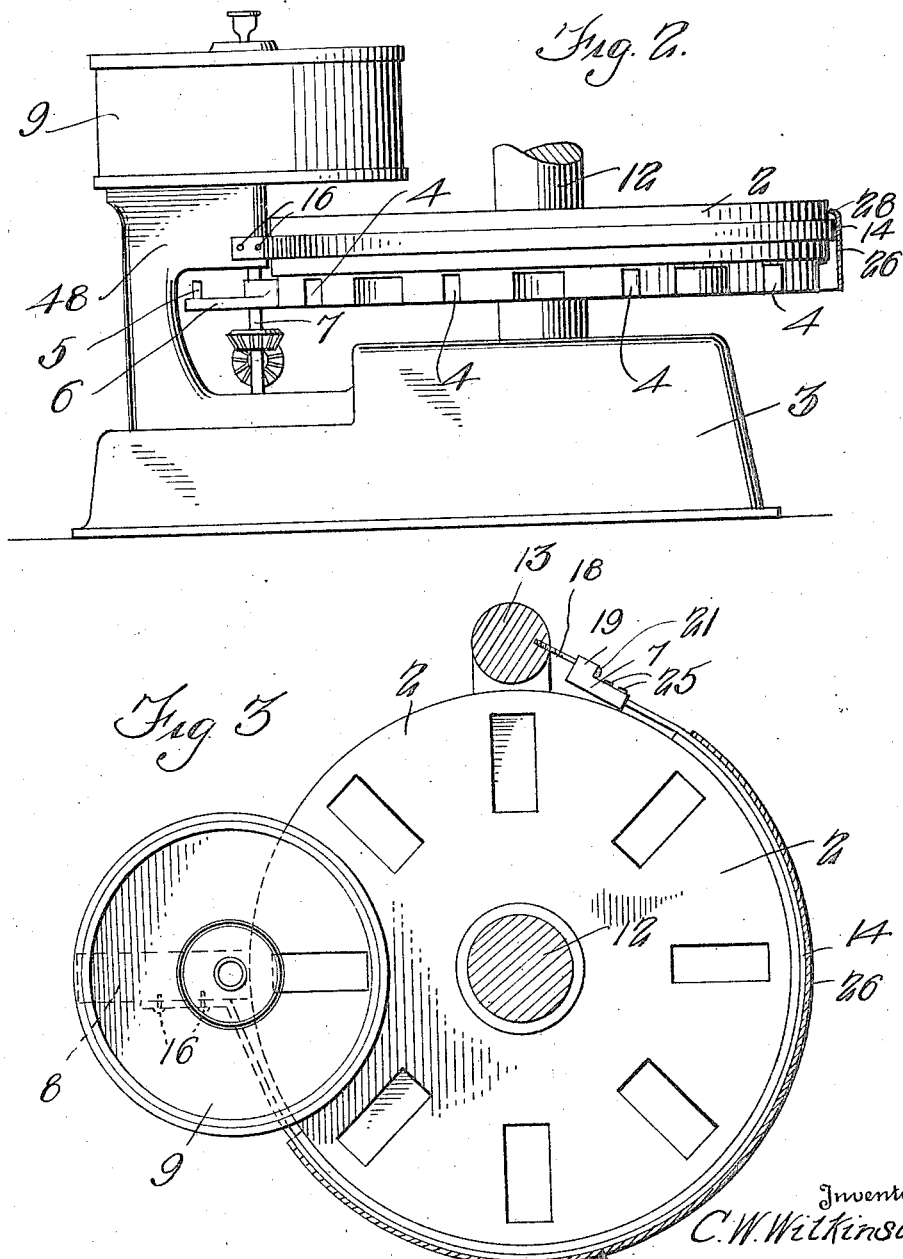

UNITED STATES PATENT OFFICE.

CHARLES W. WILKINSON, OF PLANT CITY, FLORIDA, ASSIGNOR OF ONE-HALF TO EUGENE M. LE CLAIR, OF PLANT CITY, FLORIDA.

BRAKE FOR BRICK-PRESSES.

1,302,113.

Specification of Letters Patent.

Patented Apr. 29, 1919.

Application filed May 1, 1917. Serial No. 165,737.

*To all whom it may concern:*

Be it known that I, CHARLES W. WILKINSON, a citizen of the United States, residing at Plant City, in the county of Hillsborough and State of Florida, have invented certain new and useful Improvements in Brakes for Brick-Presses; and I do hereby declare the following to be a full, clear, and exact description of the invention, such as will enable others skilled in the art to which it appertains to make and use the same.

This invention relates to brakes and more particularly to brakes for rotary brick presses, and has for its primary object to provide a means for automatically stopping the rotary table of the press and holding the same after each movement thereof, and to prevent the so-called back lashing or rearward movement of the table.

Another object of the invention is to provide an improved brake belt for engaging the periphery of the rotary table and attach the same to the press in such a way that the movement of the brake will be entirely automatic.

A further object of the invention is the provision of a guard for the brake belt to prevent sand from getting into the brake belt and thus ruining the same.

With these and other objects in view, the invention consists in the novel construction, arrangement and formation of parts as will be hereinafter specifically described, claimed and illustrated in the accompanying drawings, forming a part thereof, in which:

Figure 1 is a side elevation of a rotary brick press with the improved brake applied thereto.

Fig. 2 is a fragmental side elevation of a rotary brick press looking at the same from a different angle from Fig. 1 with the improved brake applied thereto.

Fig. 3 is a cross sectional view taken on the line 3—3 of Fig. 2.

Fig. 4 is a cross sectional view through the table taken on the line 4—4 of Fig. 2.

Fig. 5 is a vertical section through the improved brake belt.

Fig. 6 is a detail sectional view through the take-up for the improved brake belt.

Referring to the drawings in detail, wherein similar reference numerals designate corresponding parts throughout the several views, the numeral 1 generically indicates the improved brake which is attached to a vertical rotary brick press 3 of any well known or preferred construction. The brick press 3 consists of the rotary table 2 which has a series of slots 4 in its lower face opening out into the outer face thereof and receives the upwardly extending pin 5 carried by the rotary cam arm 6 keyed to the vertical shaft 7 and journaled in the upright column 8 which supports the hopper 9 and a presser head 10 is supported by the cross tree or yoke 11, which is in turn supported by the central column 12 and side column 13. The arm 6, which rotates in the direction indicated by the arrow in Fig. 4, carries the pin 5 which rides in the slots 4 and turns the table 2 therewith in the direction indicated by the arrow in Fig. 4 and gives the table 2 one-eighth of a revolution at every complete revolution of the arm 6, and when the pin 5 rides out of the slots 4 the table is stationary at which time a brick is being pressed.

The improved brake band 1 consists of a metallic band 14 having a leather strip 15 secured to its inner face by means of a plurality of copper rivets 16. The brake is snugly fitted about the periphery of the rotary table 2. The leather strip 15 terminates short of the ends of the metallic band 14 for a purpose which will hereinafter appear. One end of the metallic band is fastened, by means of bolts 16 passing through the metallic band 14, to the column 8 supporting the rotatable shaft 7 and the opposite end of the metallic band is fastened to the columns 13 of the yoke 11.

A suitable take-up 17 is provided for the brake band and consists of a stud 18 having one end anchored in the column 13 and the opposite end threaded and received in a flared aperture formed in a lug 19 carried by the clamp 20, which receives the end of the metallic band 14 opposite to the one which is secured to the column 8. A nut 21 is fitted on the end of the bolt 18 and bears against the lug and serves to adjust the tension of the improved brake belt. The clamp 20 has a slot 22 extending from one end thereof to the other end and receives the end of the metallic band 14, which is provided with a series of spaced apertures 23 adapted to register with spaced apertures 24 formed in the clamp. The apertures 23 and 24 receive suitable fastening elements 25 having their shanks partly threaded and fitted in the openings in the clamp 20, and having the lower portion of the same smooth to engage in the apertures of the metallic band to prevent the displacement of the same.

A metallic guard band 26 is secured to the brake band 1 by means of suitable screws 27 and extends above and below the edges thereof to protect the same and has its upper edge crimped and bent inwardly as at 28 to completely overlie the top edge of the belt to prevent sand or other substance from the table from getting in between the brake band and the table. The guard band 26 terminates short of the ends of the metallic band 14, as is clearly shown in Fig. 3, so as to allow the arm 6 to swing past the same.

In operation of the improved brake band, the same is secured to the press 3 in the above described manner, so that the brake band 1 is snugly fitted around the periphery of the rotatable table 2. When the pin 5, carried by the rotating arm 6, rides in one of the slots 4 to turn the table 2, owing to the strain on the pin 5, the same has a tendency to spring the column 8 in the direction indicated by the arrow in Fig. 4, which releases the brake band 1 from engagement with the periphery of the table 2 and allows the table to rotate easily. When the pin 5 has turned the table and is about to ride out of the slots 4, the same engages one side wall of the slot 4 and serves to stop the table. By reason of the extreme weight of the rotary table, the functioning of the member 5 as a stop causes the column 8 to swing slightly in the opposite direction of the arrow in Fig. 3, thereby automatically tightening the brake about the periphery of the table, which holds the same steady while a brick is being pressed and positively eliminates all back lashing or rearward movement of the table.

In practice, I have found that the form of my invention illustrated in the accompanying drawings and referred to in the above description, as the preferred embodiment, is the most efficient and practical; yet realizing the conditions concurrent to the adoption of my device will necessarily vary, I desire to emphasize that various minor changes in details of construction, proportion and arrangement of parts may be resorted to, when required without sacrificing any of the advantages of my invention as set forth.

What I claim as new is:

1. In combination, a rotary brick press including a rotary table, a supporting column, a hopper secured to said column, a cross tree, a mold carried by said cross tree to coöperate with said table, a central and side column supporting said cross tree, a rotating shaft journaled in said first named column, an arm keyed to said shaft and adapted to engage and rotate the table, of a brake band fastened to said first named column and said side column supporting the cross tree and adapted to snugly fit around the periphery of said table, whereby when said first named column is sprung in one direction through the medium of said arm keyed to the shaft journaled in said column engaging the table, the brake band is released from the periphery of the table, and when the first named column is sprung in the opposite direction, through the medium of the arm, the brake band is brought into engagement with the table, as and for the purpose specified.

2. In a device of the class described, a brick press comprising a rotary table, supporting columns, and a rotary arm carried by one of said columns and arranged to engage the table for intermittently operating the same, of a brake band arranged to snugly fit around the periphery of the table having its terminals secured to the supporting columns, and arranged to fall into and out of engagement with the periphery of the table upon movement of the operating arm, as and for the purpose specified.

3. A brick compressing machine, a base, a rotary table carried by the base; supporting columns carried by the base, a driven shaft journaled to one of said supporting columns; an operating arm carried by said shaft and adapted for intermittently rotating said table; and a brake belt connected at its ends with said columns and normally having contact with the periphery of said rotary table, said brake being adapted to be released from contact with said table upon the flexing of one of said columns as the result of the engaging of said arm with said table.

4. A brick press comprising a base; a rotary table carried by the base; supporting columns carried by the base; a driven shaft journaled through one of said supporting columns; an arm carried by said shaft and adapted for intermittently rotating said table; a brake band connected at its ends with said columns and normally having contact with the periphery of said rotary table, said brake being adapted to be released from contact with said table upon the flexing of one of said columns as the result of the engaging of said arm with said table; and means to adjust the contact of said brake band with the periphery of said table.

5. A brick press comprising a base; a rotary table carried by the base; supporting columns carried by the base; a driven shaft journaled through one of said supporting columns; an arm keyed to said shaft, said rotary table having vertically disposed peripheral slots therein, and adapted to receiving the arm carried by said driven shaft, said arm being adapted for intermittently rotating said table, and a brake belt connected with said columns and normally having contact with the periphery of said table, said brake being adapted to be released from contact with said table upon the flexing of one of said columns as the result of the engaging of said arm with the table.

In testimony whereof I affix my signature in presence of two witnesses.

CHARLES W. WILKINSON.

Witnesses:
G. B. WELLS,
C. M. YEARWOOD.

Copies of this patent may be obtained for five cents each, by addressing the "Commissioner of Patents, Washington, D. C."